United States Patent
George et al.

(10) Patent No.: US 7,299,370 B2
(45) Date of Patent: Nov. 20, 2007

(54) METHOD AND APPARATUS FOR IMPROVED RELIABILITY AND REDUCED POWER IN A PROCESSOR BY AUTOMATIC VOLTAGE CONTROL DURING PROCESSOR IDLE STATES

(75) Inventors: Varghese George, Folsom, CA (US); Mark A. Newman, Folsom, CA (US); Sanjeev Jahagirdar, Folsom, CA (US); Inder M. Sodhi, Folsom, CA (US); Tanjeer R. Khondker, Folsom, CA (US); Mathew B. Nazareth, El Dorado Hills, CA (US); John B. Conrad, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 10/459,011

(22) Filed: Jun. 10, 2003

(65) Prior Publication Data

US 2004/0255176 A1    Dec. 16, 2004

(51) Int. Cl.
*G01R 23/02* (2006.01)

(52) U.S. Cl. .............. 713/322; 713/300; 713/310; 713/320; 713/321; 713/323; 713/324; 713/330; 713/340

(58) Field of Classification Search .............. 713/300, 713/320–324, 310, 330, 340
See application file for complete search history.

(56) References Cited

U.S. PATENT DOCUMENTS

| | | | |
|---|---|---|---|
| 6,118,306 A * | 9/2000 | Orton et al. .................. 327/44 |
| 6,125,450 A * | 9/2000 | Kardach .................... 713/323 |
| 6,415,388 B1 | 7/2002 | Browning et al. |
| 6,678,831 B1 * | 1/2004 | Mustafa et al. ............. 713/320 |
| 6,704,877 B2 | 3/2004 | Cline et al. |
| 6,735,105 B2 * | 5/2004 | Nakano ...................... 365/52 |
| 6,754,837 B1 * | 6/2004 | Helms ....................... 713/322 |
| 6,785,829 B1 | 8/2004 | George et al. |
| 6,792,551 B2 * | 9/2004 | Dai ............................ 713/320 |
| 6,864,600 B2 * | 3/2005 | Malinovitch ................ 307/70 |
| 6,922,783 B2 * | 7/2005 | Knee et al. .................. 713/320 |
| 6,941,480 B1 * | 9/2005 | Dai ............................ 713/320 |
| 6,985,952 B2 * | 1/2006 | Bohrer et al. ............... 709/226 |
| 6,988,211 B2 | 1/2006 | Cline et al. |
| 6,993,669 B2 * | 1/2006 | Sherburne, Jr. ............. 713/322 |
| 7,000,133 B2 * | 2/2006 | Dodd et al. ................. 713/324 |

(Continued)

OTHER PUBLICATIONS

"Method for Reducing Power in the Halt and Stop Grant CPU states," published anonymously at www.ip.com on Sep. 25, 2002 with identifier #IPCOM000009890D.

(Continued)

*Primary Examiner*—A. Elamin
(74) *Attorney, Agent, or Firm*—Blakely, Sokoloff, Taylor & Zafman LLP (57) ABSTRACT

A method and apparatus automatically transferring to an enhanced low-power state of a processor is disclosed. In one embodiment, either all or a portion of a processor core clock distribution grid may be powered down in these enhanced low-power states. In one embodiment, the processor may operate in a reduced power supply voltage and operate at a reduced frequency during these enhanced low-power states. In one embodiment, a portion of the clock distribution grid may be left on to support snoop operations at a reduced frequency.

27 Claims, 8 Drawing Sheets

U.S. PATENT DOCUMENTS

2003/0075735 A1* 4/2003 Nakano ................... 257/200
2003/0237012 A1 12/2003 Jahagirdar et al.
2004/0117677 A1 6/2004 Jahagirdar et al.
2004/0163005 A1* 8/2004 Kardach et al. ............ 713/323
2005/0091548 A1 4/2005 George et al.
2005/0149929 A1* 7/2005 Srinivasan et al. ......... 718/100

OTHER PUBLICATIONS

U.S. Appl. No. 11/323,254, entitled Method and Apparatus for a Zero Voltage Processor Sleep State, filed Dec. 30, 2005, by Sanjeev Jahagirdar et al.

* cited by examiner

METHOD AND APPARATUS FOR IMPROVED RELIABILITY AND REDUCED POWER IN A PROCESSOR BY AUTOMATIC VOLTAGE CONTROL DURING PROCESSOR IDLE STATES

FIELD

The present disclosure relates generally to microprocessor systems, and more specifically to microprocessor systems capable of operating in low-power or reduced power states.

BACKGROUND

In order to conserve energy and reduce thermal load, many processors include the option of operating in several operating states. During the times when the processor is operating, the greatest processor clock frequency that is available may be selected to enhance processor throughput. However, during the times when instructions are not being processed, the processor may transfer to one of several available low-power states. In these states, the processor clock frequency may be reduced or completely stopped, but cache-coherency snooping may be permitted. In other states, enough of the processor may be powered-down that cache-coherency snooping may not be permitted, and the operating system software must provide for cache coherency. In the Pentium® class processors produced by Intel® Corporation, the normal operation state may be called the C0 state, the low-power states may be called the C1, C2, C3, and C4 states.

The existing low-power C1 and C2 states are not optimal with regards power conservation. The C3 and C4 states achieve higher levels of power conservation, but have several drawbacks that limit their use. One is the inability to participate in cache-coherency snoop operations. This could mean that they cannot be used when certain "bus mastering" peripherals are attached. Such bus mastering peripherals using such connections as universal serial bus (USB) and other quick-connection interfaces are becoming increasing common. Another problem is that the low-power states may have long exit latencies (the time required to come out of the low-power states). Therefore none of these existing low-power are optimal for future processor products.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for operating a processor in various extended low-power states. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of a microprocessor module with an extended halt state and an extended stop-grant state. However, the invention may be practiced in other forms of processors, such as digital signal processors.

Figure 1:
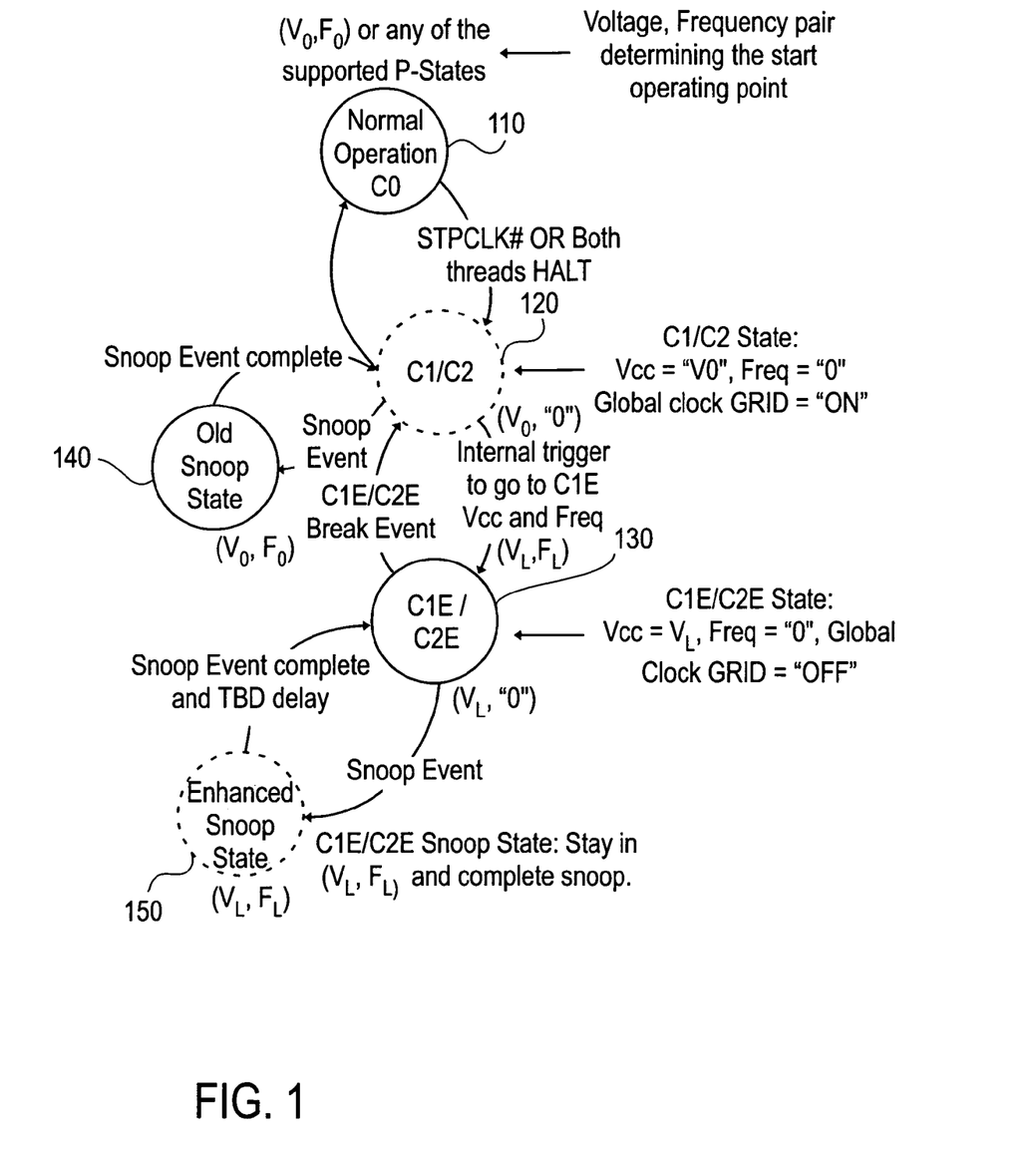
FIG. 1 is a state diagram of processor low-power states, according to one embodiment.

Referring now to FIG. 1, a state diagram of processor low-power states is shown, according to one embodiment. In one embodiment, a processor may operate in a normal operation state (or C0 state) 110 when actively processing instructions. In the normal operation state, the processor may be operating under conditions of supply voltage $V_0$ and processor core clock frequency $F_0$. During other operational situations, there may be many other combinations of supply voltage and processor core clock frequency $V_i$, $F_i$.

In order to conserve power, reduce thermal load, and in some cases extend reliability by reducing the voltage across gate insulation layers, the processor may transfer to a low-power state 120 whenever the processor is able. The low-power state 120 may be one of several such states well-known in the art. For example, low-power state 120 may be a halt state (or C1 state), wherein the halt state may be entered by software executing a special HALT or MWAIT instruction. During operation in halt state, large portions of the circuitry of the processor may be powered-down. Many of the processor clock circuits may be powered-down, although the distribution clock grid of the processor may be left powered-on. During the halt state, the supply voltage $V_0$ does not change: neither does the assigned processor core clock frequency $F_0$.

In addition to the halt state, the low-power state 120 may be a stop grant state (or C2 state). The stop grant state may be somewhat different than the halt state. For example, the stop grant state may be entered upon hardware in the processor receiving a stop clock STPCLK signal, which may originate in a chipset after an advanced configuration and power interface (ACPI) register is read. During operation in stop grant state, large portions of the circuitry of the processor may be powered-down. Many of the processor clock circuits may be powered-down, although the distribution clock grid of the processor may be left powered-on. During the halt state, the supply voltage $V_0$ does not change: neither does the assigned processor core clock frequency $F_0$.

When a processor is operating in a multi-processor system, it may need to cooperate in cache-coherency schemes by responding to snoop requests. If the processor is operating in a low-power state 120, such as the halt state or the stop grant state, the processor clock and cache circuits may be powered-down when a snoop request is received. Therefore a low-power state 120 may transfer to an existing (or "old") snoop state 140, where enough of the circuits and clocks are powered-on to respond to the cache-coherency snoop request. After the request is serviced, the existing snoop state 140 may transfer back to the low-power state 120.

In order to enhance the power conservation and improve reliability provided by low-power state 120, in one embodiment an enhanced low-power state 130 may be used. Unlike the low-power state 120, no external stimuli are required to enter the enhanced low-power state 130. If the processor is operating in the low-power state 120, then when the enhanced low-power state 130 is enabled the processor automatically transfers from low-power state 120 to enhanced low-power state 130. When transferring in from a halt state (C1), the enhanced low-power state 130 may be called a C1E state. When transferring in from a stop grant state (C2), the enhanced low-power state 130 may be called a C2E state.

When the processor enters an enhanced low-power state 130, it may select one of many combinations of supply voltage and processor core clock frequency Vi, Fi different from the normal operation state 110 combination $V_0$, $F_0$. In one embodiment, the frequency $F_L$, corresponding to the lowest permitted ratio of bus clock frequency to processor core clock frequency, is paired with the lowest voltage $V_L$ compatible with $F_L$. In one embodiment, the lowest permitted ratio is 16:1. This combination $F_L$, $V_L$ may then be used by an enhanced low-power state 130.

In an enhanced low-power state 130, the distribution clock grid of the processor may in some embodiments be turned off, as well as many of the clocks of the processor. The processor core phase-locked loop (PLL) which may serve as a clock reference may in some embodiments be left powered on in order to reduce the time required to synchronize clocks when leaving the enhanced low-power state 130. In such embodiments, there may be an alternate feedback path for the processor core PLL to permit locking when certain circuit elements are powered off.

In some embodiments, the distribution clock grid of the processor may be subdivided to create a processor bus interface domain as a subset of the overall clock grid. In some embodiments, a processor bus interface domain may be an input/output clock domain, which may be considered the distribution clock grid subset for the buffers and signals available at the boundaries of the processor. In other embodiments, the processor bus interface domain may be a clock domain of the sections of the processor that need to be on to monitor the internal and external break events, or may be a clock domain of the sections of the processor that need to be on to service cache-coherency snooping. In these embodiments, the enhanced low-power states may turn the power off to the distribution clock grid of the processor with the exception of the processor bus interface domain. This may permit the processor to act upon interrupts, signals on the system bus, and other interface signals. In one embodiment, the processor may support an enhanced snoop state 150. In enhanced snoop state 150, the snoop request may be serviced with the processor in operating in the supply voltage and frequency combination $F_L$, $V_L$. The snoop request may be adequately serviced at $F_L$, $V_L$ as the snoop request servicing is not processor computationally intensive. In some embodiments, the enhanced low-power state may need to transfer to the old snoop state 140 via the low-power state 120 in order to service snoop requests.

Figure 2:
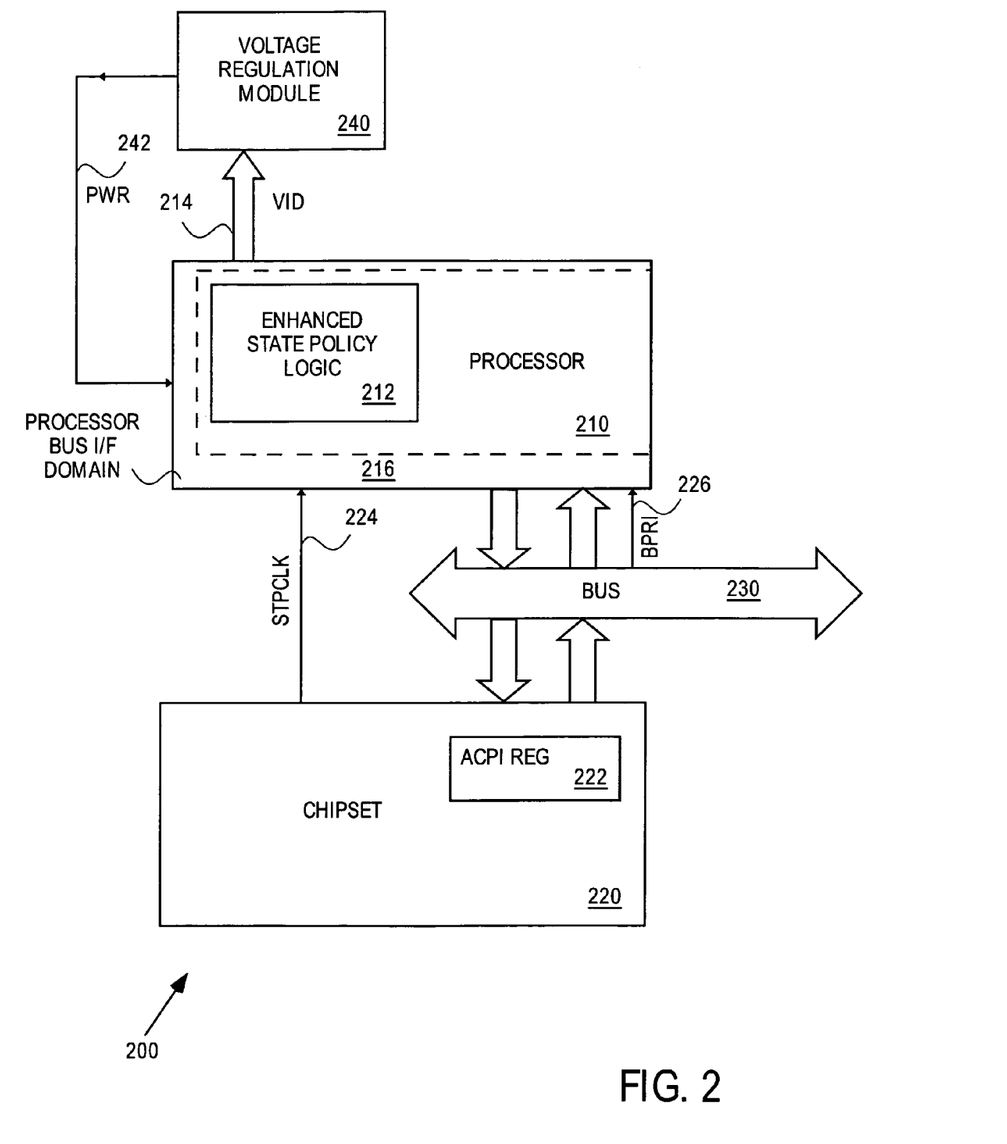
FIG. 2 is a system diagram of a processor system, according to one embodiment.

Referring now to FIG. 2, a system diagram of a processor system 200 is shown, according to one embodiment. In the FIG. 2 embodiment, processor 210 is shown connected with chipset 220 via a bus 230. The FIG. 2 embodiment may be a uniprocessor system, or there may be other processors (not shown) connected via bus 230. Chipset 220 may be a single integrated circuit, or may have its functional elements distributed among 2 or more integrated circuits. Chipset 220 is shown including an advanced configuration and power interface (ACPI) register 222. When processor 210 reads from a location in ACPI register 222, the chipset may respond with a stop clock STPCLK signal 224 to processor 210, putting processor into a stop grant (C2) state. Processor 210 also may send signals on a voltage identifier (VID) signal line 214 to a voltage regulation module 240 that supplies power to the processor 210 and possibly to other circuit elements. The signals presented by processor 210 on the VID signal line 214 may configure the power supply voltage on power line 242 supplied to the processor 210.

Processor 210 may in one embodiment include an enhanced state policy logic 212 that may contain logic elements that support the automatic transfer of the processor 210 from a low-power state 120 to a corresponding enhanced low-power state 130, as discussed above in connection with FIG. 1. Enhanced state policy logic 212 may in one embodiment turn off clock circuits within processor 210, but may permit a core PLL to continue in operation via an alternate feedback path. Enhanced state policy logic 212 may in one embodiment turn off the clock grid for the processor 210. In other embodiments, processor 210 may have the clock grid subdivided to create a processor bus interface domain 216 that supports processor 210 interface circuits such as VID signal line 214, the STPCLK signal line 224, and bus 230. In this embodiment, the enhanced state policy logic 212 may turn off portions of the clock grid other than processor bus interface domain 216 while leaving the processor bus interface domain 216 powered on. The processor 210 may respond to cache-coherency snoop requests initiated by a bus priority (BPRI) signal 226 by transferring to an enhanced snoop state 150. In embodiments without a processor bus interface domain 216, the processor 210 may respond to cache-coherency snoop requests initiated by a bus priority (BPRI) signal 226 by transferring to an old snoop state 140 via the low-power state 120. This may require not powering down the processor clock grid.

In some embodiments, enhanced state policy logic 212 may reduce the processor 210 operating voltage within an enhanced low-power state by signaling the voltage regulation module 240 via the VID signal lines 214. The enhanced state policy logic 212 may also reduce the processor core clock frequency. In one embodiment, the frequency $F_L$, corresponding to the lowest permitted ratio of bus clock frequency to processor core clock frequency, is paired with the lowest voltage $V_L$ compatible with $F_L$. In one embodiment, the lowest permitted ratio is 16:1. This combination $F_L$, $V_L$ may then be set by the enhanced state policy logic 212 during the automatic transfer from a low-power state 120 to a corresponding enhanced low-power state 130. In one embodiment, the transfer to the lower processor core clock frequency occurs somewhat before the transfer to the lower voltage.

Figure 3A:
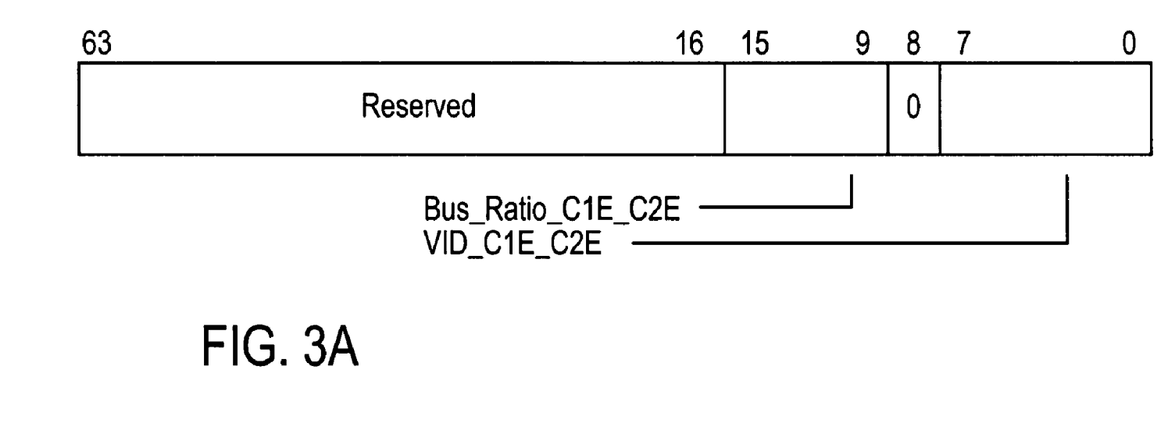
FIG. 3A is diagram of an operating point register, according to one embodiment of the present disclosure.

Referring now to FIG. 3A, a diagram of an operating point register is shown, according to one embodiment of the present disclosure. When a processor 210 has the enhanced low-power states enabled, which may be an enhanced halt state (C1E) or an enhanced stop grant state (C2E), the reduced supply voltage and frequency may be set by using an operating point register, which may be one of several model specific registers (MSRs) of the processor. In one embodiment, the ratio of bus clock frequency to processor core clock frequency may be set by the bits located at bits 9 through 15 in the operating point register. Similarly, the VID signal bits for the VID signal line 214 may be set by the bits located at bits 0 through 7 in the operating point register. At reset, bits 0 through 7 may be initialized with a value predetermined by the processor. In other embodiments, these operating points may be set in other ways, including being set by the system basic input/output system (BIOS).

Figure 3B:
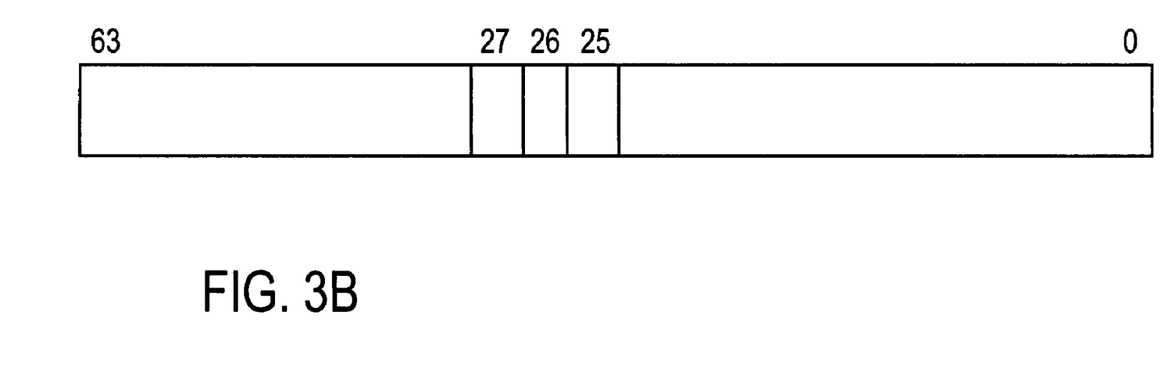
FIG. 3B is diagram of a configuration register, according to one embodiment of the present disclosure.

Referring now to FIG. 3B, a diagram of a configuration register is shown, according to one embodiment of the present disclosure. The configuration register may be another MSR. In one embodiment, bit 25 may be set to enable the enhanced halt state (C1E) automatically being entered upon halt state (C1) entry. In one embodiment, bit 27 may be set to enable the enhanced stop grant state (C2E) automatically being entered upon stop grant state (C2) entry.

Figure 4:
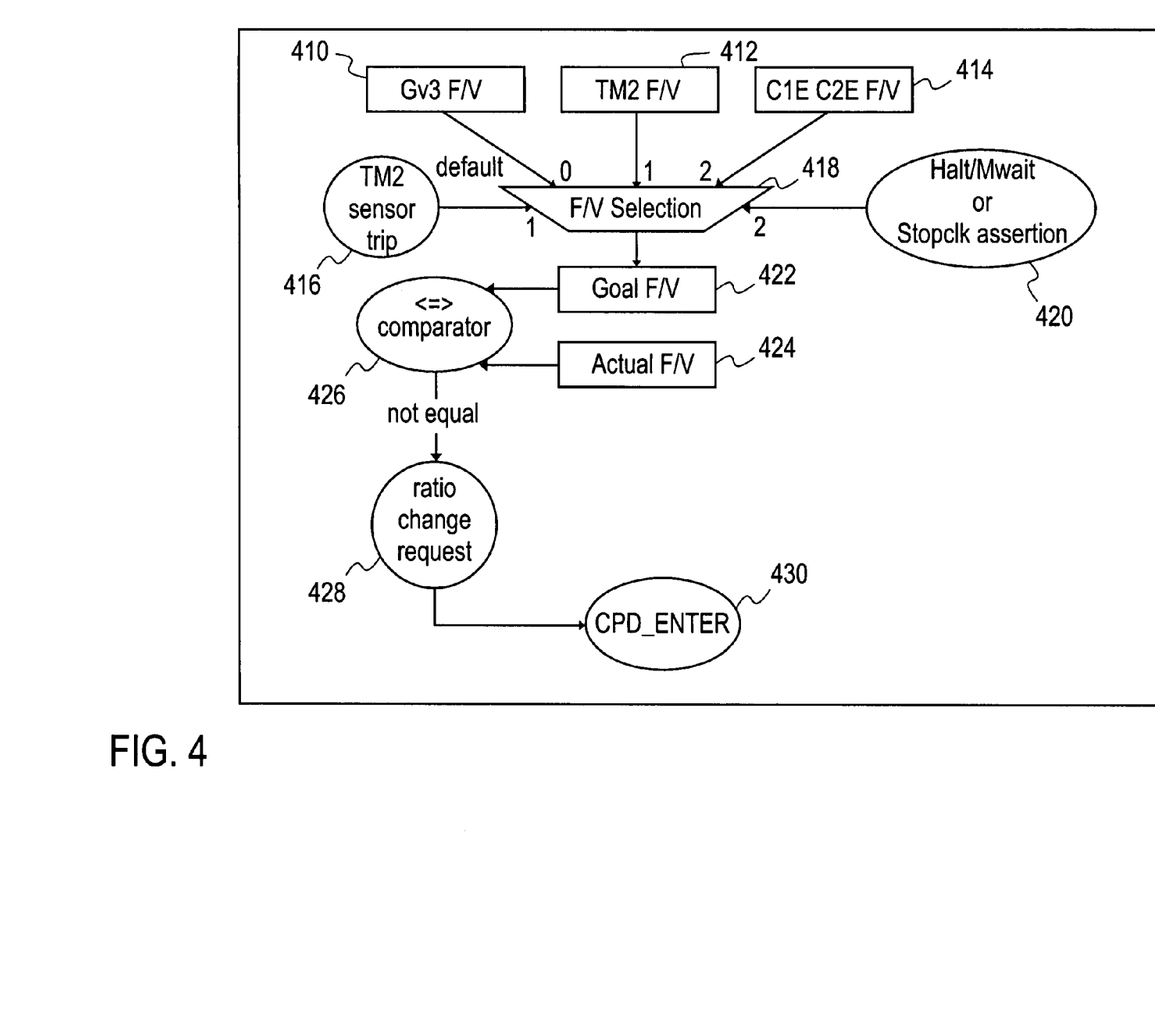
FIG. 4 is a logic diagram of the selection of a frequency and voltage value, according to one embodiment of the present disclosure.

Referring now to FIG. 4, a logic diagram of the selection of a frequency and voltage value is shown, according to one embodiment of the present disclosure. In the FIG. 4 embodiment, there may be three registers containing a normal operation frequency and voltage value (Gv3 F/V) register 410, a thermal monitor 2 frequency and voltage value (TM2 F/V) register 412, and an enhanced low-power state (C1E C2E F/V) register 414. The values for the enhanced low-power state (C1E C2E F/V) register 414 may be as set in the operating point register of FIG. 3A. The values of the three registers may be selected by a frequency and voltage selection multiplexor 418 on the basis of a thermal monitor 2 sensor trip logic 416 and a HALT/MWAIT or STPCLK assertion logic 420. Multiplexor 418 generally passes to the goal frequency and voltage register 422 the value from the normal operation frequency and voltage value (Gv3 F/V) register 410, unless either thermal monitor 2 sensor trip logic 416 and a HALT/MWAIT or STPCLK assertion logic 420 override it. In that case, if thermal monitor 2 sensor trip logic 416 is asserted, then the value from the thermal monitor 2 frequency and voltage value (TM2 F/V) register 412 is passed to the goal frequency and voltage register 422. If the HALT/MWAIT or STPCLK assertion logic 420 is asserted, then the value from the enhanced low-power state (C1E C2E F/V) register 414 is passed to the goal frequency and voltage register 422. In case both the thermal monitor two sensor trip logic 416 and the HALT/MWAIT or STPCLK assertion logic 420 are asserted, the thermal monitor two takes priority and the value from the thermal monitor two frequency and voltage value (TM2 F/V) register 412 is passed to the goal frequency and voltage register 422.

If the comparator 426 determines that the value in the goal frequency and voltage register matches the value in the actual frequency and voltage register 424, then no action is needed. However, if they do not match, then a action is initiated in ratio change request logic 428 which initiates a new central processor power down (CPD) entry utilizing CPD_ENTRY logic 430.

Figure 5A:
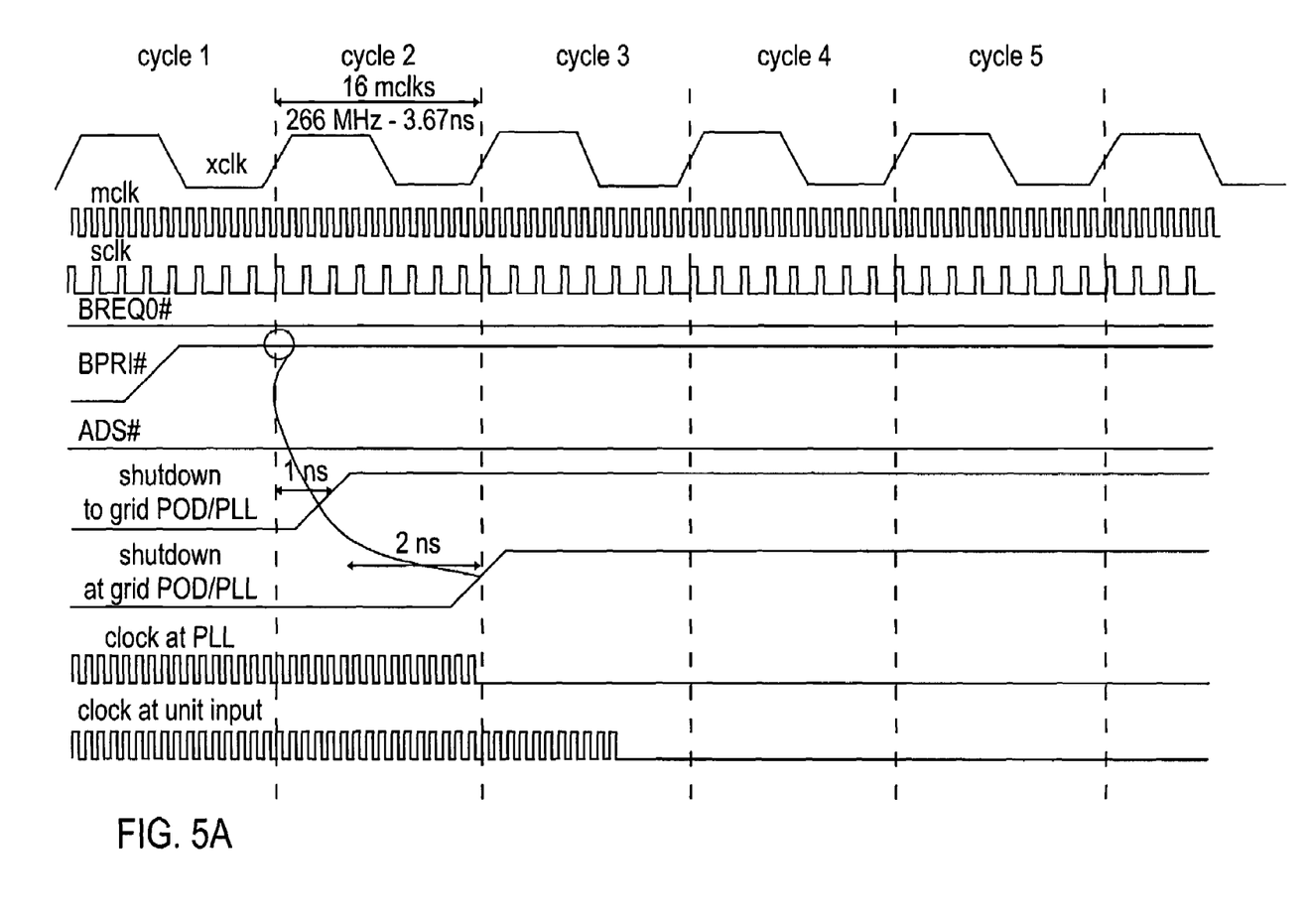
FIG. 5A is a timing diagram of turning a clock grid off, according to one embodiment of the present disclosure.

Referring now to FIG. 5A, a timing diagram of turning a clock grid off is shown, according to one embodiment of the present disclosure. In one embodiment, the clock grid shut down is initiated by a bus priority (BPRI#) going inactive (logic high) during bus clock cycle 1. This may be in response to a cache-coherency snoop request having completed. Then in bus clock cycle 2 a shutdown signal is sent to grid signal point of distribution (POD) and PLL is initiated. After a distribution delay, the shutdown signal reaches the POD and PLL, and the clock at the PLL ceases operation. The clock from the PLL ceases at other points during bus clock cycle 3 due to distribution delay.

Figure 5B:
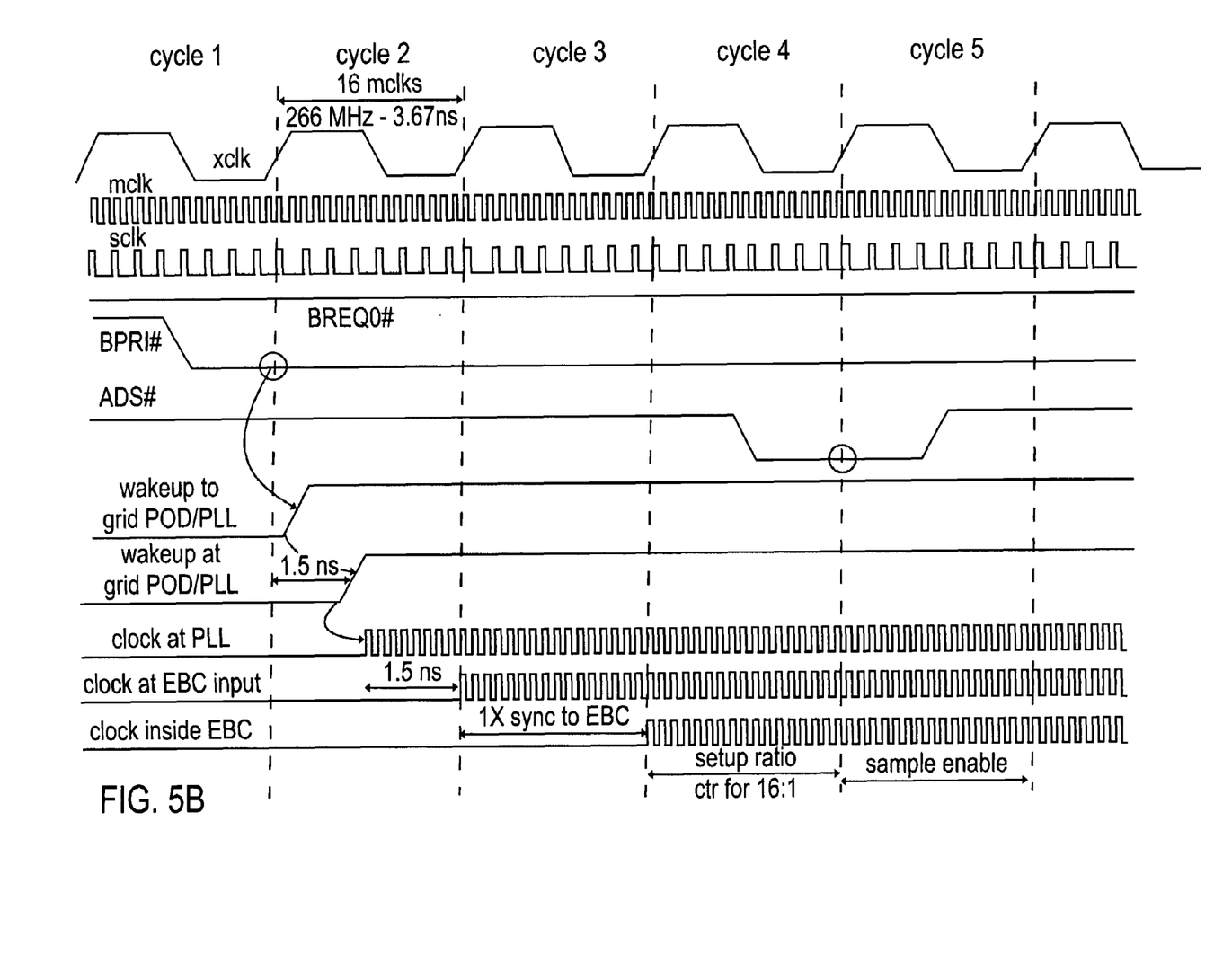
FIG. 5B is a timing diagram of turning a clock grid on, according to one embodiment of the present disclosure.

Referring now to FIG. 5B, a timing diagram of turning a clock grid on is shown, according to one embodiment of the present disclosure. In one embodiment, the clock grid shut down is initiated by a bus priority (BPRI#) going active (logic low) during bus clock cycle 1. This may be in response to a cache-coherency snoop request initiation. A wakeup signal is sent to the grid POD and PLL, which arrives at the grid POD and PLL after a distribution delay. The PLL clock begins operation a short time later, and arrives at the external bus clock (EBC) circuit. During bus clock cycle 3, the EBC circuit is synchronized, and then the ratio of bus clock to processor core clock is set during bus clock cycle 4. Then the processor may act upon bus data during bus clock cycle 5.

Figure 6:
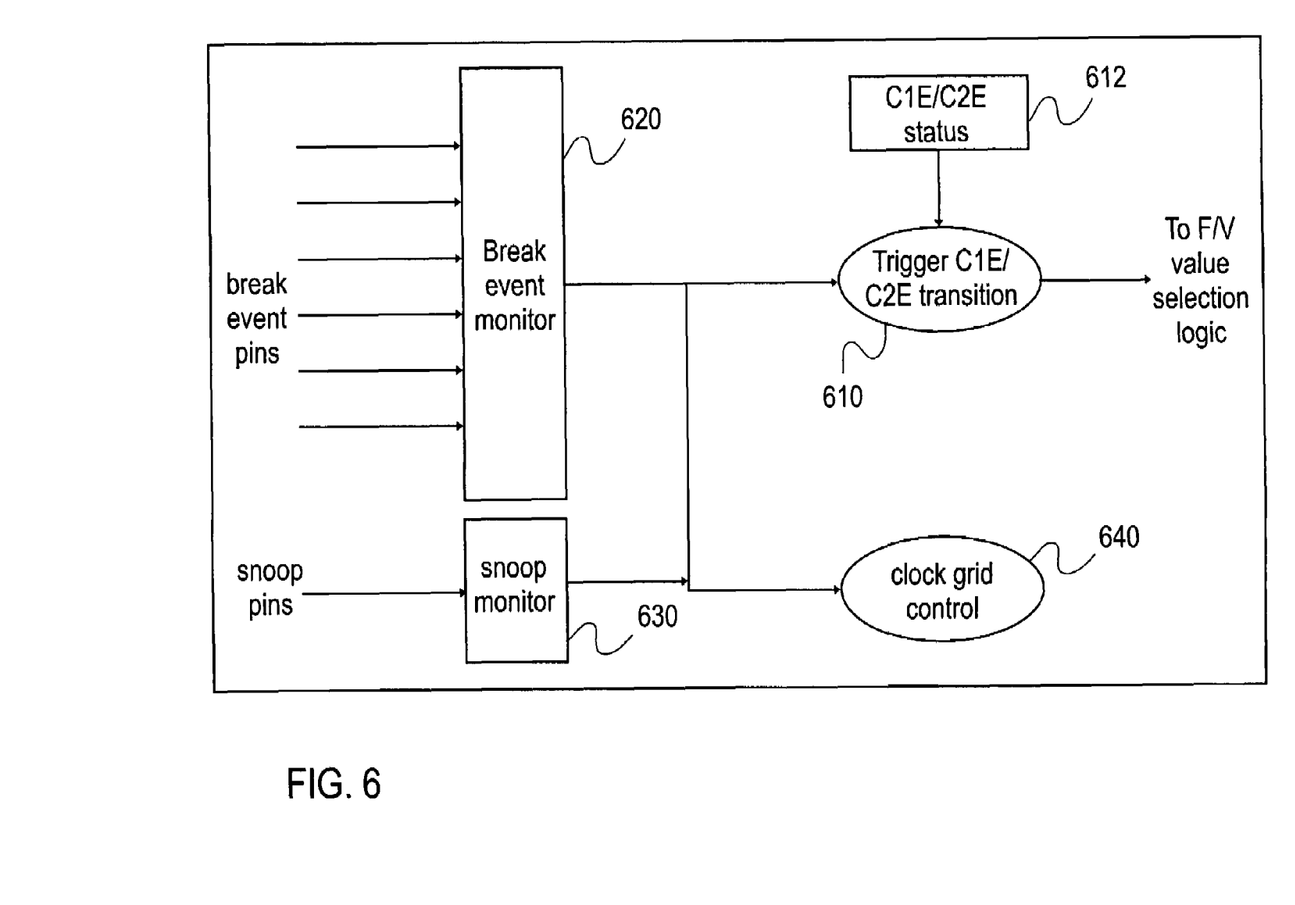
FIG. 6 is a diagram of a break event handler, according to one embodiment of the present disclosure.

Referring now to FIG. 6, a diagram of a break event handler is shown, according to one embodiment of the present disclosure. In one embodiment, the processor clock grid may be powered down during an enhanced low-power state. External pins of processor 210 may characterize break events from the enhanced low-power state that cause the enhanced low-power state to transfer ("break") away to another state. In some embodiments, these break event pins may include STPCLK de-assertion, reset assertion, interrupt assertion, non-maskable interrupt (NMI) assertion, system management interrupt (SMI) assertion, or machine check assertion. In other embodiments, other external break events may be used. A break event monitor 620 may be used in processor 210 to determine these break events. If one is detected, then break event monitor 620 may signal trigger enhanced low-power state transition logic 610 to change value in the goal frequency and voltage register 422 of FIG. 4. The trigger enhanced low-power state transition logic 610 operates under the status provided by enhanced low-power state status logic 612. Break event monitor 620 may also signal clock grid control 640 to power up the clock distribution grid.

Similarly, snoop pins may include bus priority (BPRI) signal pins and other pins related to cache-coherency snooping. If a snoop request is detected, then snoop monitor 630 may not signal trigger enhanced low-power state transition logic 610 to change value in the goal frequency and voltage register 422 of FIG. 4. Snoop monitor 630 will signal clock grid control 640 to power up the clock distribution grid, in order to service the snoop request.

Figure 7:
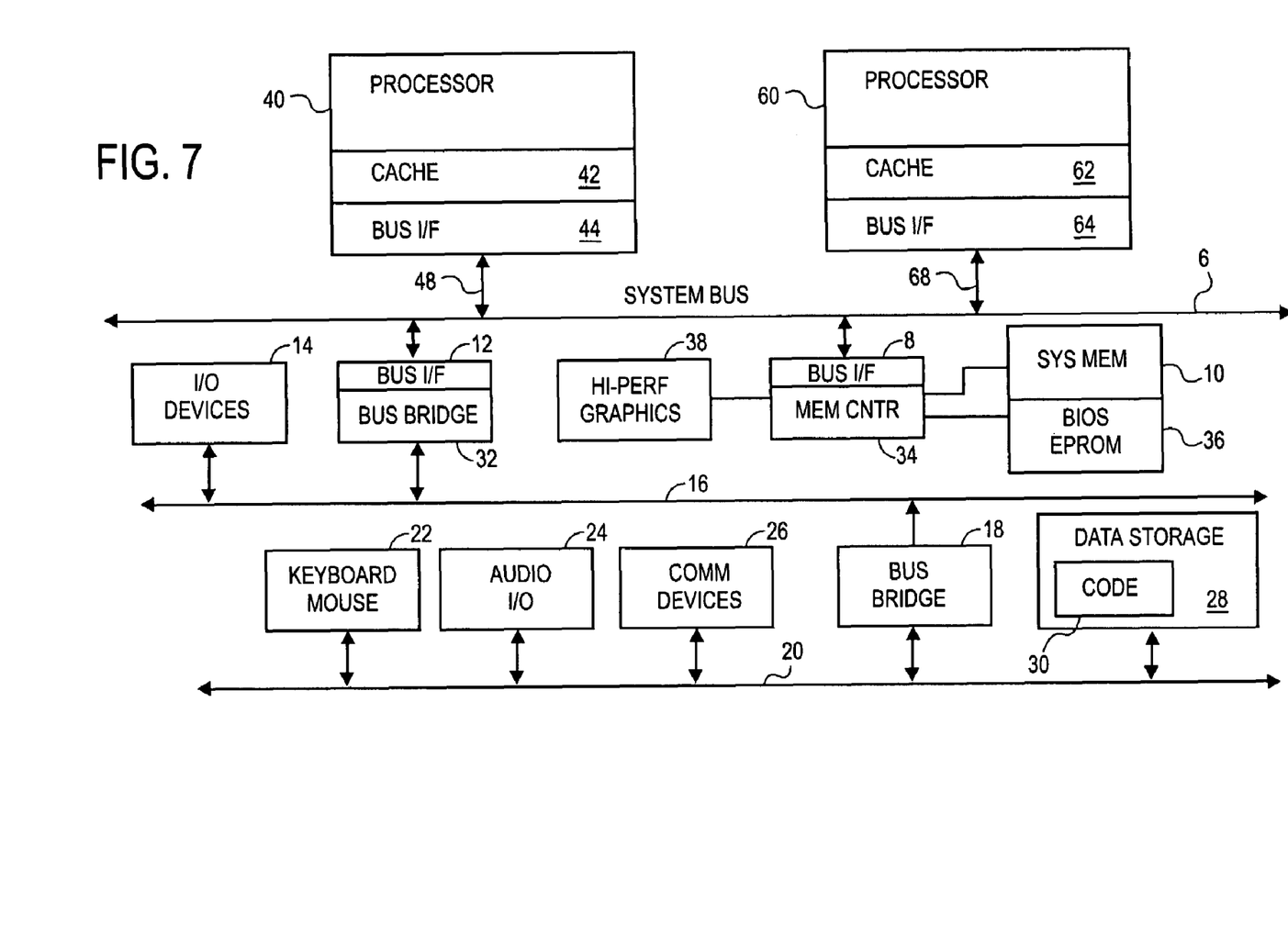
FIG. 7 is a schematic diagram of a multi-processor system, according to an embodiment of the present disclosure.

Referring now to FIG. 7, a schematic diagram of a microprocessor system is shown, according to one embodiment of the present disclosure. The FIG. 7 system may include several processors of which only two, processors 40, 60 are shown for clarity. Processors 40, 60 may be the processor 210 of FIG. 2. Processors 40, 60 may include caches 42, 62. The FIG. 7 multiprocessor system may have several functions connected via bus interfaces 44, 64, 12, 8 with a system bus 6. In one embodiment, system bus 6 may be the front side bus (FSB) utilized with Pentium® class microprocessors manufactured by Intel® Corporation. A general name for a function connected via a bus interface with a system bus is an "agent". Examples of agents are processors 40, 60, bus bridge 32, and memory controller 34. In some embodiments memory controller 34 and bus bridge 32 may collectively be referred to as a chipset, and may be the chipset 220 of FIG. 2. In some embodiments, functions of a chipset may be divided among physical chips differently than as shown in the FIG. 7 embodiment.

Memory controller 34 may permit processors 40, 60 to read and write from system memory 10 and from a basic input/output system (BIOS) erasable programmable read-only memory (EPROM) 36. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface, or an AGP interface operating at multiple speeds such as 4X AGP or 8X AGP. Memory controller 34 may direct read data from system memory 10 to the high-performance graphics circuit 38 across high-performance graphics interface 39.

Bus bridge 32 may permit data exchanges between system bus 6 and bus 16, which may in some embodiments be a industry standard architecture (ISA) bus or a peripheral component interconnect (PCI) bus. There may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
    a processor having an operation state, a stop grant state, and an enhanced stop grant state, the processor including logic to reduce voltage supplied to the processor to power the processor at a reduced voltage in response to the processor entering the enhanced stop grant state from the stop grant state;
    wherein the logic is to turn off at least a portion of a clock grid for the processor in response to the processor entering the enhanced stop grant state.

2. The apparatus of claim 1, wherein the logic is to reduce a clock frequency in response to the processor entering the enhanced stop grant state.

3. The apparatus of claim 1, wherein the logic is to issue a voltage identification code to reduce voltage.

4. The apparatus of claim 1, wherein the logic is to leave on a clock grid portion for a processor bus interface domain in response to the processor entering the stop grant state.

5. The apparatus of claim 1, wherein the processor is to enter the stop grant state in response to a stop clock signal.

6. The apparatus of claim 1, wherein the processor is to service at the reduced voltage a snoop request received while in the enhanced stop grant state.

7. The apparatus of claim 1, wherein the processor is to reduce voltage based on a ratio of bus clock frequency to processor core clock frequency.

8. The apparatus of claim 1, wherein the processor has a halt state and wherein the logic is to reduce voltage supplied to the processor to power the processor at a reduced voltage in response to the processor entering the halt state.

9. An apparatus comprising:
    a processor having an operation state, a halt state, and an enhanced halt state, the processor including logic to reduce voltage supplied to the processor to power the processor at a reduced voltage in response to the processor entering the enhanced halt state from the halt state;
    wherein the logic is to turn off at least a portion of a clock grid for the processor in response to the processor entering the enhanced halt state.

10. The apparatus of claim 9, wherein the logic is to reduce a clock frequency in response to the processor entering the enhanced halt state.

11. The apparatus of claim 9, wherein the logic is to issue a voltage identification code to reduce voltage.

12. The apparatus of claim 9, wherein the logic is to leave on a clock grid portion for a processor bus interface domain in response to the processor entering the halt state.

13. The apparatus of claim 9, wherein the processor is to enter the halt state in response to execution of an instruction.

14. The apparatus of claim 9, wherein the processor is to service at the reduced voltage a snoop request received while in the enhanced halt state.

15. The apparatus of claim 9, wherein the processor is to reduce voltage based on a ratio of bus clock frequency to processor core clock frequency.

16. A method comprising:
    entering a processor into an enhanced stop grant state from a stop grant state; and reducing voltage supplied to the processor to power the processor at a reduced voltage in response to the processor entering the enhanced stop grant state;
    turning-off at least a portion of a clock grid for the processor in response to the processor entering the enhanced stop grant state.

17. The method of claim 16, comprising leaving on a clock grid portion for a processor bus interface domain in response to the processor entering the stop grant state.

18. The method of claim 16, comprising servicing at the reduced voltage a snoop request received while in the enhanced stop grant state.

19. The method of claim 16, comprising:
    entering the processor into an enhanced halt state from a halt state; and
    reducing voltage supplied to the processor to power the processor at a reduced voltage in response to the processor entering the halt state.

20. An apparatus comprising:
    means for entering a processor into an enhanced stop grant state from a stop grant state;
    means for reducing voltage supplied to the processor to power the processor at a reduced voltage in response to the processor entering the enhanced stop grant state; and
    means for turning-off at least a portion of a clock grid for the processor in response to the processor entering the enhanced stop grant state.

21. The apparatus of claim 20, comprising means for servicing at the reduced voltage a snoop request received while in the enhanced stop grant state.

22. The apparatus of claim 20, comprising:
means for entering the processor into an enhanced halt state from a halt state; and
means for reducing voltage supplied to the processor to power the processor at a reduced voltage in response to the processor entering the enhanced halt state.

23. A system comprising:
a processor having an operation state, stop grant state, and an enhanced stop grant state, the processor including logic to reduce voltage supplied to the processor to power the processor at a reduced voltage in response to the processor entering the enhanced stop grant state from the stop grant state;
an audio input/output device; and
wherein the logic is to turn off at least a portion of a clock grid for the processor in response to the processor entering the enhanced stop grant state.

24. The system of claim 23, wherein the processor is to service at the reduced voltage a snoop request received while in the enhanced stop grant state.

25. The system of claim 23, wherein the processor has an enhanced halt state and wherein the logic is to reduce voltage supplied to the processor to power the processor at a reduced voltage in response to the processor entering the enhanced halt state.

26. The apparatus of claim 7, wherein the bus clock frequency is the lowest frequency that is compatible with the processor core clock voltage of the lowest voltage level of the processor core.

27. The apparatus of claim 15, wherein the bus clock frequency is the lowest frequency that is compatible with the processor core clock voltage of the lowest voltage level of the processor core.

* * * * *